United States Patent Office 3,247,200
Patented Apr. 19, 1966

3,247,200
PROCESS FOR PREPARING AMINO-CARBOXYLIC ACID AMIDES
Ivar Ugi and Cornelius Steinbrückner, Munich, Germany, assignors to Aktiebolaget, Astra, Apotekarnes Kemiska Fabriker Sodertalje, a company of Sweden
No Drawing. Filed Jan. 21, 1960, Ser. No. 3,745
Claims priority, application Germany, Jan. 22, 1959, U 5,930; June 29, 1959, U 6,310; Jan. 8, 1960, U 6,797
10 Claims. (Cl. 260—247.2)

The invention relates to a general method for the preparation of α-amino-carboxylic acid amides and derivatives thereof having the atom grouping

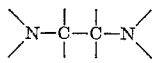

as structural element. It is very important to be able to prepare them in a simple and cheap manner, which is the object of the invention. Another object is to prepare entirely new compounds containing said structural element in a simple and cheap manner.

As compounds of this type may be mentioned amino acid amides and acyl amino-acid amides. Many such compounds are valuable for pharmacological and for the most various industrial purposes. Among the pharmacologically valuable substances may be mentioned local anaesthetics, psychopharmaca, analgetics, sedatives etc.

According to the invention said compounds containing the NCCN-grouping are prepared by reacting isonitriles with imonium ions, i.e. compounds containing the structural element

 (1)

or rather

 (2)

in the presence of nucleophilic reactants.

Most of the known reactions of isonitriles involve a ionic addition of one electrophilic and one nucleophilic partner at the "divalent" carbon atom of the isonitrile according to the following scheme

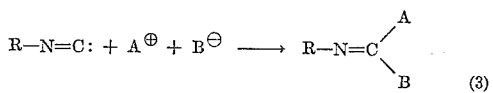 (3)

Imonium ions are reaction partners of pronounced electrophilic reactivity and distinguish themselves over most other electrophilic agents by being able to be formed and react in relatively weakly acid medium. The invention is based upon the consideration that imonium ions thus may be particularly favourable reaction partners for the strongly nucleophilic isonitriles. They (A⊕) react under simultaneous incorporation of an available nucleophilic agent (B⊖) with isonitriles according to the above scheme (3) under the formation of a primary adduct having the structure of an imino acyl compound

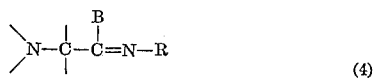 (4)

These labile primary adducts stabilize themselves by secondary reactions determined by the constitution of the imonium ion and the nucleophilic agent. However, common for the so formed end products is the fact that they contain the structural element

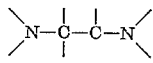

in which any two of the indicated valences may form a double bond or be part of a ring.

The isonitriles required for the method according to the invention are nowadays easily available (see I. Ugi and R. Meyr, Angew, Chem. 70, page 702 (1958)). For the present method aliphatic, aromatic, araliphatic or heterocyclic isonitriles come into consideration. Examples of suitable isonitriles are isopropyl isocyanide, n-butyl isocyanide, tert.-butyl isocyanide, cyclohexyl isocyanide, benzyl isocyanide, pyridyl isocyanide and 2,6-dimethylphenyl isocyanide.

Suitable nucleophilic partners are negatively charged or electrically neutral molecules having at least one free electron pair. Examples thereof are water, carboxylic acids and their salts and amino acids.

The imonium ion required for the reaction may be prepared in various ways. One source for the imonium ion constitutes the addition of a proton to a Schiff's base or an eneamine. Schiff's bases and eneamines are condensation products of amines with ketones or aldehydes, and by the influence of acids they are capable of forming imonium ions. Such condensation products of carbonyl compounds and amines need not necessarily be present as such, but may in most cases with advantage also be formed only during the reaction, in as much as the starting materials for these condensation products, such as aldehydes and amines, may be added directly to the reaction according to the invention.

As carbonyl compounds, which form the basis of the imonium ions, may come into consideration: aldehydes and ketones, for example formaldehyde, acetaldehyde, propion adehyde, n-butyraldehyde, isobutyraldehyde, benzaldehyde, the β-amino acroleins obtained from propinal by addition of amines, β-dimethylamino pivalaldehyde, dimethyl ketone, methyl-ethyl ketone, diethyl ketone, methyl-propyl ketone, ethyl-propyl ketone, dipropyl ketone, dibutyl ketone, benzyl-methyl ketone, dibenzyl ketone and cyclohexanone.

As amine components for the imonium ions it may be used: ammonia or primary or secondary amines as well as their salts, such as methyl amine, dimethyl amine, ethyl amine, diethyl amine, propyl amine, dipropyl amine, butyl amine, methyloctyl amine, dibutyl amine, piperidine, morpholine, cyclohexyl amine, benzyl amine, phenyl-ethyl amine, and aniline.

Generally the reaction according to the invention takes place as follows:

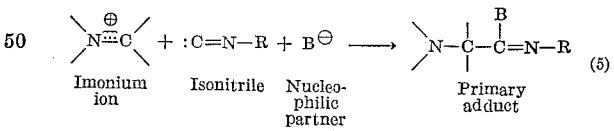 (5)

Imonium ion    Isonitrile   Nucleo-    Primary
                            philic     adduct
                            partner As mentioned above the primary adduct stabilizes itself through a secondary reaction determined by its constitution and forms an end product which can be isolated. Possible types of secondary reactions will be elucidated by the following examples:

If water is used as nucleophilic partner even a proton displacement leads to a stable end product according to the scheme:

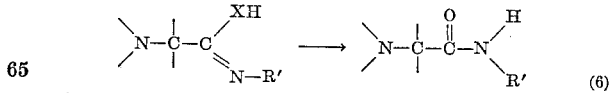 (6)

By the use of other nucleophilic agents the secondary reactions may lead to more or less radical transformation of the molecule skeleton.

Still another course takes the secondary reaction at simultaneous use of a carboxylic acid and a primary amine. In the imino carboxylic acid anhydride primarily formed there are in close space relationship simultaneously an amino group that can be acylated and an anhydride group that has an acylating capacity. Through intramolecular acyl displacement the system is transformed into an acyl amino acid amide:

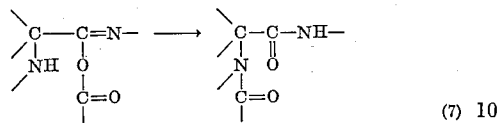

In the case that in the above mentioned mixed anhydrides no groups are present, which can be acylated, because, for instance, it was started with a secondary amine, the stabilisation of the reactive system takes place in such manner that the acyl group will be transferred intramolecularly in some other way.

In carrying out the reaction the required components are added in arbitrary order. Preferably the reaction is carried out in suitable solvents such as, for instance, methanol, benzene, tetrahydrofuran, acetone, chloroform or water. The reaction takes place quite easy by mixing the starting materials at room temperature and it is in some cases necessary to cool the reaction mixture in order to moderate the reaction.

The invention will now be elucidated through the following examples which illustrate the general application of the reaction formula and the primary and/or secondary reactions given in the formulas.

*Example 1.—N-piperidino acetic acid cyclohexylamide*

8.50 g. piperidine (100 mmols) were dissolved in 9.70 ml. 10 N hydrochloric acid (97 mmols), 10.00 ml. 10 N formaldehyde solution and 10.00 ml. methanol. With stirring on ice bath were 10.90 g. (100 mmols) cyclohexylisocyanide added dropwise during 5 minutes at room temperature. The reaction mixture was poured in 30 ml. 2 N hydrochloric acid and extracted three times with 15 ml. portions of methylene chloride. The methylene chloride solution was discarded. The aqueous solution was made alkaline with 20 ml. 40% sodium hydroxide and extracted four times with 25 ml. portions of methylene chloride. The combined extracts were dried over sodium sulfate and the solvent evaporated. The residue weighed 20.25 g. Most of it was crystalline. (Crude yield: 90% with M.P. 65–71° C.) The product can be purified by recrystallization from benzene petroleum ether with a raise in M.P. to 73–74° C. Yield: 17.2 g. (78%).

*Example 2.—Diethylamino-aceto-2,6-xylidide*

14.60 g. diethyl amine (200 mmols) was dissolved in 19.50 ml. 10 N hydrochloric acid and 12.50 ml. 10 N aqueous formaldehyde solution. A solution of 13,10 g. (100 mmols) 2,6-xyliso-cyanide in 90 ml. methanol and 10 ml. benzene was added. After mixing it was set aside for 70 hours at room temperature. Most of the methanol was distilled off at 150–300 mm Hg. The reaction mixture was made acidic to Congo red and diluted with methylene chloride. The extract was discarded. The aqueous solution was made alkaline to phenolphthalein with 40% sodium hydroxide and extracted twice with 50-ml. poritons of methylene chloride. The extracts were dried over sodium sulfate and the solvent evaporated. The residue was 21.5 g. yellow oil. Vacuum distillation gave 18.25 g. xylocaine base (B.P. 125–8° C. at 0.001 mm. Hg).

*Example 3.—Diethylamino-aceto-2,6-xylidide*

2.60 g. 2,6-dimethyl-phenyl-isocyanide, dissolved in 10 ml. t-butylalcohol chloroform (6+4), was added to a mixture of 4.40 g. diethylamine, 2.0 ml. 98% formic acid and 2.50 ml. formalin. After 15 hours at room-temperature the isolation gave 4.32 g. xylocaine base with B.P. 140–145° C. at 0.005 mm. Hg and M.P. 63–67° C.

*Example 4.—α-(n-Propylamino)-propioanilide*

2.85 g. n-propylamine hydrochloride and 2.57 g. phenylisocyanide was dissolved in 10 ml. water and 40 ml. acetone. 1.32 g. acetaldehyde was added dropwise with agitation. After one week the mixture was saturated with potassium carbonate, the organic layer separated and dried over potassium carbonate. The solvent was evaporated and the residue distilled in high vacuum. 2.6 g. oil distilled at 120–150° C. at 0.01 mm. Hg. The product was dissolved in benzene and precipitated as hydrochloride with gasous hydrochloric acid. 2.5 g. crystals, which melted above 150° C. with decomposition, was obtained.

*Example 5.—n-Butylaminoaceto-2-chloro-6-methylanilide*

3.0 g. butylamine hydrochloride, 2.25 ml. formalin (40%) 3.8 g. 2-methyl-6-chloro-phenylisocyanide, one drop pyridine, a few crystals of pyridine hydrochloride, 10 ml. water and 30 ml. acetone were mixed and set aside for three weeks. After saturating the mixture with potassium carbonate the organic layer was separated and dried over potassium carbonate. The solvent was driven off and the residue distilled in high vacuum. 1.7 g. viscous oil, boiling at 140–170° C. at 0.01 mm. Hg, was obtained. Instead of butylamine hydrochloride and formaldehyde the corresponding amount of n-butylformaldimine and pyridine hydrochloride can be used.

*Example 6.—Piperidino-aceto-2,6-xylidide*

3.63 g. piperidine hydrochloride, 2.25 ml. 40% formalin, 3.27 g. 2,6-dimethylphenylisocyanide, 10 ml. water and 40 ml. acetone were mixed. After one week the mixture was saturated with potassium carbonate, the organic layer separated, dried over potassium carbonate and the solvent evaporated. The residue was distilled in high vacuum. 4.2 g. viscous oil, boiling at 140–160° C./0.01 mm. Hg, was obtained.

*Example 7.—α-Piperidino-isovaleric acid cyclohexylamide*

4.25 g. (50 mmols) piperidine, 2.70 g. (45 mmols) glacial acetic acid and 1.80 g. (25 mmols) isobutyraldehyde was dissolved in 20 ml. methanol and treated with 2.72 g. (25 mmols) cyclohexylisocyanide at room temperature.

After agitation the mixture was allowed to stand at room temperature for two days. It was then made acidic with 20 ml. 2 N hydrochloric acid and extracted three times with 10 ml. methylene chloride. The extracts were discarded. The aqueous solution was made alkaline with 20 ml. 40% sodium hydroxide and extracted four times with 15 ml. portions of methylene chloride. The combined extracts were dried over sodium sulfate and the solvent evaporated. The residue weighed 4.92 g. and melted at 154–165° C. After recrystallization from benzene petroleum ether (1+10) 4.01 g. pure product with M.P. 170–172 was obtained.

*Example 8.—N-Phenyl-N-methyl-glycine-N'-cyclohexyl-amide*

3.21 g. N-methylaniline, 2.4 ml. conc. hydrochloric acid and 1.87 ml. 40% formalin was dissolved in 10 ml. methanol and 5 ml. water. With stirring on icebath 3.0 ml. cyclohexylisocyanide was added dropwise. The reaction mixture was set aside for 100 hours. When the solvent was driven off a yellowish, crystalline mass was left. After recrystallization from isopropanol 2.5 g. hydrochloride of the title compound with M.P. 200–202° C. was obtained.

*Example 9.—N-n-Butyl-glycine-N'-cyclohexyl-amide*

2.19 g. n-butylamine, 2.4 ml. conc. hydrochloric acid and 3.0 ml. cyclohexylisocyanide was dissolved in 10 ml.

methanol and 2 ml. water. With agitation 1.87 ml. 40% formalin was added dropwise. After 40 hours at room temperature 100 ml. benzene was added and the solution extracted three times with 20 ml. portions of 2 N hydrochloric acid. The acidic, aqueous solution was made alkaline with sodium hydroxide and extracted with methylene chloride. After evaporation of the methylene chloride 3.7 g. partly crystalline mass was obtained. By recrystallization from benzene petroleum ether (1+1) it gave 2.2 g. pure product with M.P. 122–123.5° C.

*Example 10*

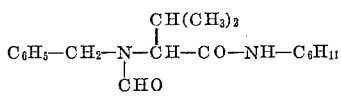

21.4 g. benzylamine, 9.2 g. formic acid and 10.8 g. isobutyraldehyde was dissolved in 80 ml. methanol and 15 ml. water. With agitation on ice bath 10.9 g. cyclohexylisocyanide was added dropwise. After standing for 18 hours at room temperature the solvent was evaporated. The residue was a yellowish, fluorescing, partly crystalline oil. It was dissolved in methylene chloride, the solution filtered and the solvent distilled in vacuum. 23.2 g. yellowish crystals with M.P. 74–80° C. was obtained.

*Example 11*

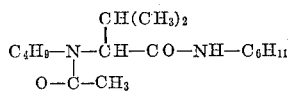

3.65 g. n-butylamine, 3.0 g. glacial acetic acid and 1.8 g. isobutyraldehyde was dissolved in 10 ml. methanol and 5 ml. water. With agitation on ice bath 3.0 ml. cyclohexylisocyanide was added dropwise. The reaction mixture was allowed to stand for one week and then acidified with 30 ml. 2 N hydrochloric acid. The neutral substance was dissolved in methylenechloride and separated. Evaporation of the methylene chloride left 6.3 g. of a crystalline mass with M.P. 50–56° C. By recrystallization from petroleum ether at low temperature 5.2 g. pure product melting 54–57° C. was obtained.

*Example 12*

3.96 g. morpholine hydrochloride, 4.53 g. β-dimethyl-amino-pivalinaldehyde hydrochloride, 4.35 g. p-dimethyl-aminophenyl isocyanide, 10 ml. water and 40 ml. methanol were mixed and allowed to stand at room temperature for one week. The residue left after evaporation of the solvent was treated with benzene and aqueous sodium hydroxide. The organic layer was separated and dried. The hydrochloride was precipitated from the benzene solution with gaseous hydrochloric acid 7.8 g. yellowish crystals was obtained. They decomposed above 140° C. The product had the following formula:

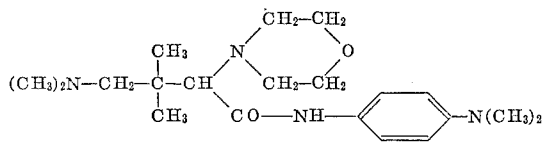

*Example 13.—N-acetylamino-isovaleric acid N'-cyclohexylamide*

3.85 g. (50 mmols) ammonium acetate, one drop of conc. aqueous ammonia, 1.80 g. (25 mmols) isobutyraldehyde and 2.72 g. (25 mmols) cyclohexyl isocyanide were dissolved in 20 ml. methanol and 5 ml. water and allowed to stand for one day at room temperature. Some of the reaction product separated crystalline. The crystalline part (2.45 g. with M.P. 230–231° C.) was separated by filtration and the filtrate reduced to about 35% of its volume, from which 864 mg. of the product with M.P. 224–229° C. separated. The product could be purified from methanol. Total yield 3.11 g. with M.P. 230.5–231.0° C.

*Example 14.—N-acetyl-N-cyclohexyl-amino-phenyl-acetic acid N'-cyclohexylamide*

9.35 g. benzal-cyclohexyl amine (50 mmols) and 4.91 g. cyclohexyl isocyanide (45 mmols) were added with ice cooling to 1.24 g. cyclohexyl amine (12.5 mmols) and 3.75 g. glacial acetic acid (62.5 mmols) dissolved in 8 ml. methanol. After standing overnight the reaction mixture solidified to a crystalline mass. The product was recovered by filtration and dried. Crude yield 14.53 g. with M.P. 143–148° C. After recrystallization from benzene cyclohexane (1+1) the product melted at 150–151° C. Yield 12.6 g.

*Example 15.—N-Formylamino-isovaleric acid N'-cyclohexylamide*

In analogy with Example 13 ammonium formiate, isobutyraldehyde and cyclohexyl isocyanide were reacted at 0° C. After 12 hours at 20° C. the mixture was boiled for one hour and then worked up. Crude yield 3.04 g. with M.P. 190–192° C. 2.13 g. pure product resulted from recrystallization from methanol. M.P. 199–200° C.

What is claimed is:

1. The process of preparing compounds of the formula

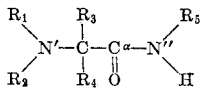

which comprises reacting together with an imonium ion of the formula

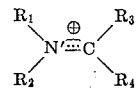

as one reaction partner, an isonitrile of the formula C=N—R$_5$ as a second reaction partner, and a nucleophilic agent as a third reaction partner capable of being transformed during a rearrangement to supply the =O to the α carbon atom in which formulae R$_1$ and R$_2$ are groups of the class consisting of hydrogen, saturated aliphatic, saturated monocyclic aliphatic, monocyclic aromatic, and monocyclic aromatic-saturated aliphatic consisting of not more than 8 carbon atoms, hydrogen and not more than 1 ether oxygen atom, and groups in which R$_1$ and R$_2$ are joined to form a monocyclic ring, R$_3$ and R$_4$ are groups of the class consisting of hydrogen, saturated aliphatic, saturated monocyclic aliphatic, monocyclic aromatic and monocyclic aromatic-saturated aliphatic, consisting of carbon, hydrogen and not more than 1 tertiary amino nitrogen atom, and groups in which R$_3$ and R$_4$ are joined to form a monocyclic ring, the total number of carbon atoms in said groups R$_3$ and R$_4$ being not more than 14, and R$_5$ is a group of the class consisting of saturated aliphatic, saturated monocyclic aliphatic, monocyclic aromatic and monocyclic aromatic-saturated aliphatic groups, consisting of carbon, hydrogen, not more than 1 chlorine atom, not more than 1 nitrogen atom of the class consisting of amino and heterocyclic nitrogens, and containing in the aggregate not more than 8 carbon atoms, and where said nucleophilic agent is a negative ion of the class consisting of OH⁻, and RCOO⁻, wherein R is a group of the class consisting of hydrogen, and saturated lower alkyl groups, said reaction being carried out at a temperature high enough to produce said carboxylic acid amide without substantial conversion of isonitrile to nitrile.

2. The process of preparing compounds of the formula

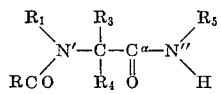

which comprises reacting together with an imonium ion of the formula

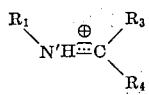

as one reaction partner, an isonitrile of the formula C=N—R₅ as a second reaction partner, and the anion RCOO⁻ as a third reaction partner in which formulae R₁ is a group of the class consisting of hydrogen, saturated aliphatic, saturated monocyclic aliphatic, monocyclic aromatic and monocyclic aromatic-saturated aliphatic groups consisting of not more than 8 carbon atoms, hydrogen, and not more than 1 ether oxygen atom, R₃ and R₄ are groups of the class consisting of hydrogen, saturated aliphatic, saturated monocyclic aliphatic, monocyclic aromatic and monocyclic aromatic-saturated aliphatic, consisting of carbon, hydrogen, and not more than 1 tertiary amino nitrogen atom, and groups in which R₃ and R₄ are joined to form a monocyclic ring, the total number of carbon atoms in said groups R₃ and R₄ being not more than 14, and R₅ is a group of the class consisting of saturated aliphatic, saturated monocyclic aliphatic, monocyclic aromatic and monocyclic aromatic-aliphatic groups consisting of carbon, hydrogen, not more than 1 chlorine atom, not more than 1 nitrogen atom of the class consisting of amino and heterocyclic nitrogens and containing in the aggregate not more than 8 carbon atoms, and wherein R is a group of the class consisting of hydrogen, and saturated lower alkyl groups, said reaction being carried out at a temperature high enough to produce said carboxylic acid amide without substantial conversion of isonitrile to nitrile.

3. The process of claim 2 in which the imonium ion is formed in situ by reaction between a carbonyl compound of the formula

and an amine of the formula

H₂N—R₁

4. The process of claim 1 wherein R₁ and R₂ are groups of the class consisting of (1) hydrogen, (2) methyl, (3) ethyl, (4) n-propyl, (5) isopropyl, (6) butyl, (7) cyclohexyl, (8) benzyl, (9) phenylethyl, (10) phenyl, and (11) united to each other to form one group of the class consisting of tetramethylene, pentamethylene and 3-oxa-pentamethylene.

5. The process of claim 1 wherein R₃ and R₄ are groups of the class consisting of (1) hydrogen, (2) methyl, (3) ethyl, (4) propyl, (5) butyl, (6) phenyl, (7) p-dimethylamino-phenyl, and (8) benzyl.

6. The process of claim 1 in which the imonium ion is formed in situ by reaction between a carbonyl compound of the formula

and an amine of the formula

7. The process of claim 1 in which an acid is used as catalyst.

8. The process of claim 1 for the preparation of α-amino-carboxylic acid amides in which the nucleophilic agent is OH⁻ supplied by water.

9. The process of claim 1 where R₅ is a group of the class consisting of isopropyl, n-butyl, isobutyl, cyclohexyl, benzyl, phenyl, 2,6-dimethyl phenyl, 2-chloro-6-methyl-phenyl and p-dimethylamino-phenyl.

10. The process of claim 1 in which the reaction is carried out at room temperature in solution in an appropriate solvent.

References Cited by the Examiner

UNITED STATES PATENTS 2,235,638  3/1941  Hromatka _____ 260—256.4
2,602,794  7/1952  Hitchings et al. ____ 260—256.4

OTHER REFERENCES

Bergman: The Chemistry of Acetylene and Related Compounds, page 80, Interscience Publishers Inc., N.Y. (1948).

Morton: The Chemistry of Heterocyclic Compounds, page VI of the preface (1946).

Whitmore: Organic Chemistry (second edition), pages 418–419 (1951).

NICHOLAS S. RIZZO, *Primary Examiner.*

IRVING MARCUS, *Examiner.*